US009951727B2

(12) United States Patent
Gautier et al.

(10) Patent No.: US 9,951,727 B2
(45) Date of Patent: Apr. 24, 2018

(54) VALVE, PARTICULARLY AN EXHAUST GAS RECIRCULATION VALVE

(71) Applicant: Valeo Systemes de Controle Moteur, Cergy Saint Christophe (FR)

(72) Inventors: Sylvain Gautier, Ennery (FR); Frédéric Ribera, Acheres (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 143 days.

(21) Appl. No.: 14/653,583

(22) PCT Filed: Dec. 16, 2013

(86) PCT No.: PCT/FR2013/053097
§ 371 (c)(1),
(2) Date: Jun. 18, 2015

(87) PCT Pub. No.: WO2014/096658
PCT Pub. Date: Jun. 26, 2014

(65) Prior Publication Data
US 2015/0345434 A1 Dec. 3, 2015

(30) Foreign Application Priority Data

Dec. 20, 2012 (FR) .................... 12 62389

(51) Int. Cl.
*F02M 26/73* (2016.01)
*F16K 49/00* (2006.01)
*F01N 13/00* (2010.01)
*F02M 26/11* (2016.01)
(Continued)

(52) U.S. Cl.
CPC ............ *F02M 26/73* (2016.02); *F01N 13/00* (2013.01); *F02M 26/11* (2016.02); *F16K 49/005* (2013.01); *F01N 2260/024* (2013.01);

*F01N 2390/00* (2013.01); *F02D 9/02* (2013.01); *F02D 9/04* (2013.01); *Y10T 29/49407* (2015.01)

(58) Field of Classification Search
CPC ........ F02M 26/51; F02M 26/65–26/74; F02M 2026/002–2026/0055; F16K 49/00; F16K 49/005–49/007; F16K 2099/0098
USPC ... 123/568.11–568.12, 568.21–568.28, 41.17
See application file for complete search history.

(56) References Cited

U.S. PATENT DOCUMENTS 3,720,235 A * 3/1973 Schrock ................ F16L 11/121
128/204.18
9,062,636 B2 * 6/2015 Nishimori .......... F02M 25/0795

FOREIGN PATENT DOCUMENTS

EP 1 605 235 A1 12/2005
FR 2 848 272 A1 6/2004

OTHER PUBLICATIONS

International Search Report issued in corresponding PCT Application No. PCT/FR2013/053097 dated Mar. 31, 2014 (2 pages).

* cited by examiner

*Primary Examiner* — Erick Solis
*Assistant Examiner* — Robert Werner
(74) *Attorney, Agent, or Firm* — Osha Liang LLP

(57) ABSTRACT

The invention pertains to a valve, particularly an exhaust gas recirculation valve, said valve comprising a conduit (4) for circulating a cooling fluid having a wall (10) intended to come in contact with a circulation flange of said cooling fluid, said wall (10) having a plurality of grooves (16) and ribs (14) configured to limit contact between said flange and said wall (1) at said ribs (14), said ribs (14) being formed by machining and said grooves (16) being produced from molding the valve.

8 Claims, 2 Drawing Sheets

Figure 1:
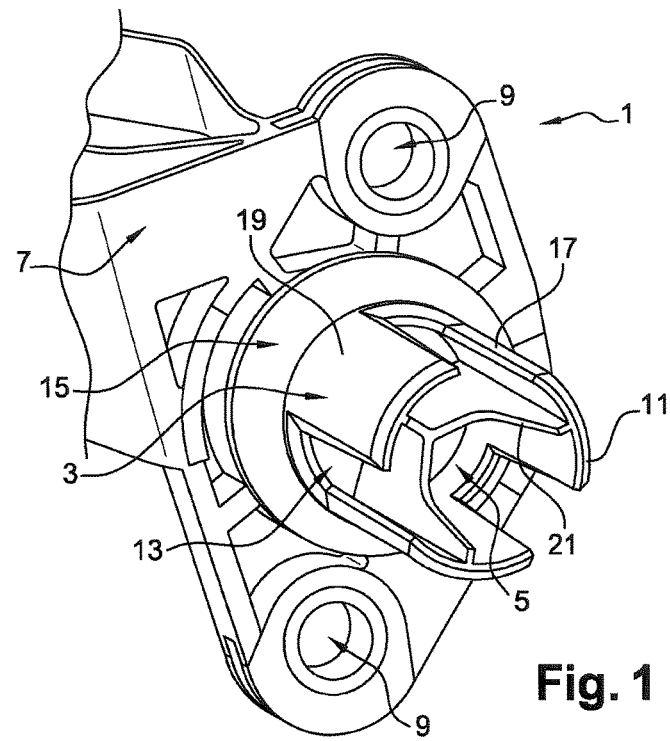

(51) Int. Cl.
*F02D 9/02* (2006.01)
*F02D 9/04* (2006.01)

VALVE, PARTICULARLY AN EXHAUST GAS RECIRCULATION VALVE

The invention relates to a valve. This valve may be a valve of a combustion engine air circuit. Within the meaning of the invention, a "combustion engine air circuit" means the circuit between the intake and the exhaust outlet of the combustion engine. The valve may be positioned in the intake circuit, in the exhaust circuit, or in a recirculation (the English acronym is EGR) loop via which exhaust gases reinjected into the intake side pass.

The combustion engine is, for example, carried onboard a motor vehicle.

In general, an exhaust gas recirculation system for an internal combustion engine makes it possible to reduce the amount of nitrogen oxides present in the exhaust gases. Conventionally, such a recirculation system comprises a bypass channel on the exhaust gas pipe, this channel being fitted with a flow regulating valve, called an EGR valve, allowing the desired quantity of exhaust gases to be returned to the intake side of the engine.

Such a valve therefore has passing through it gases which, although they are sometimes cooled before they pass through the valve, are at very high temperatures. It is therefore appropriate to cool said valve and in order to do so it is known practice to use a coolant passing through a network of ducts passing through the valve.

In order to circulate coolant through the valve, use is made of inlet and/or outlet flanges. These are centered on the ducts of the valve with which they communicate via a barrel that encourages the placement and positioning of the flanges on the valve.

Moreover, it is known practice to create such valves using molding, notably injection molding under pressure. In that way a skin effect is achieved at the surfaces of the component, particularly of the cooling walls thereof. Said skin effect is beneficial to the durability of the component. This is because should it become weakened, the porosity of the component and therefore the risks of leakage and/or corrosion would be increased.

That being so, it is desirable to be able to adjust the size of the duct by machining in order to allow the flange to be positioned accurately on the valve. The skin effect obtained during molding then carries the risk of being lost.

As an alternative, the valve may be a valve of a combustion engine cooling circuit. For such a valve, the same problems as those mentioned with regard to a combustion engine air circuit valve, notably an EGR valve, may also arise.

The invention proposes to overcome these problems by limiting the machined surfaces.

The invention thus relates to a valve comprising a duct for the circulation of a coolant, said duct being provided with a wall intended to come into contact with a flange for circulation of said coolant, said wall having a plurality of grooves and of ribs which are configured to limit contact between said flange and said wall in the region of said ribs, said ribs being formed by machining and said grooves originating from a molding of the valve.

In other words, the most recessed surfaces, namely the grooves, are not those that have been machined but those that have been obtained by molding. Stated differently, the ribs come out of the mold with an excess surplus of material which is then machined away, whereas the grooves come directly out of the mold without being reworked.

In that way, the machined surfaces are limited while still keeping them where they are needed, namely for centering the flange. This then reduces impairments to the skin effect which are encountered with the prior art while at the same time sacrificing nothing in terms of reliable positioning of the flange.

According to various embodiments which may be considered together or separately:
- said duct has a longitudinal direction of extension and said ribs and/or said grooves extend in said direction of extension,
- said ribs and said grooves alternate angularly perpendicular to said direction,
- said ribs and/or said grooves have, perpendicular to said direction, a trapezoidal shape,
- a large base of said ribs is mounted in the angular extension of a small base of said grooves and/or a large base of said grooves is mounted in the angular extension of a small base of said ribs. In other words, along one and the same first perimeter about the direction of extension, a large base of a rib may alternate with a small base of a groove whereas along one and the same second perimeter about the direction of extension, a small base of a rib may alternate with a large base of a groove. The distance between the first perimeter and the center of the duct may be less than that between the second perimeter and the center of the duct, or vice versa.
- said large bases of the grooves and said small bases of the ribs are mounted facing a mouth of said duct,
- said duct comprises a shoulder, said shoulder being formed by a longitudinal end of said ribs and/or of said grooves,
- said valve comprises a projecting part of a body of said valve in the region of which said duct opens,
- said ribs are intended to come into contact with a centering barrel of said flange,
- said valve comprises said flange,
- said flange comprises a centering barrel for centering it in the duct through which said coolant circulates, said barrel extending in a longitudinal direction, said barrel having passing through it a channel for the circulation of said coolant extending in said longitudinal direction,
- said barrel has one or more passages allowing transverse circulation for the fluid between said circulation duct and said circulation channel of said flange,
- said duct is advantageously flared in line with said barrel in order to create a jacket for the circulation of said coolant between said barrel and the wall of said duct in the region of said grooves.

In another of its aspects a further subject of the invention is a method of manufacturing a valve in which:
- molding is used to create a valve comprising a duct for the circulation of a coolant, said duct being provided with a wall intended to come into contact with a flange for the circulation of said coolant, said wall having, at the end of molding, a plurality of grooves and of protruding parts, and
- the protruding parts are machined in order to obtain ribs.

For example the end of the protruding parts facing the duct is machined, the part of the protruding parts that remains after machining then forming the ribs. The transition from as-molded protruding parts to ribs is thus achieved by the removal of material. The grooves for their part come directly from the mold without being reworked.

Figure 2:
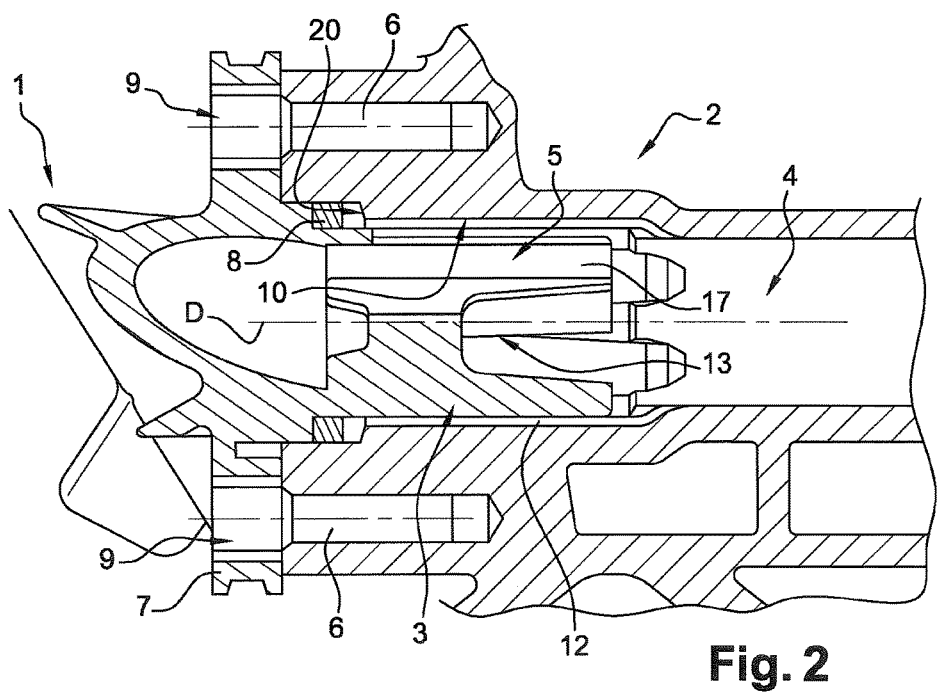
Figure 3:
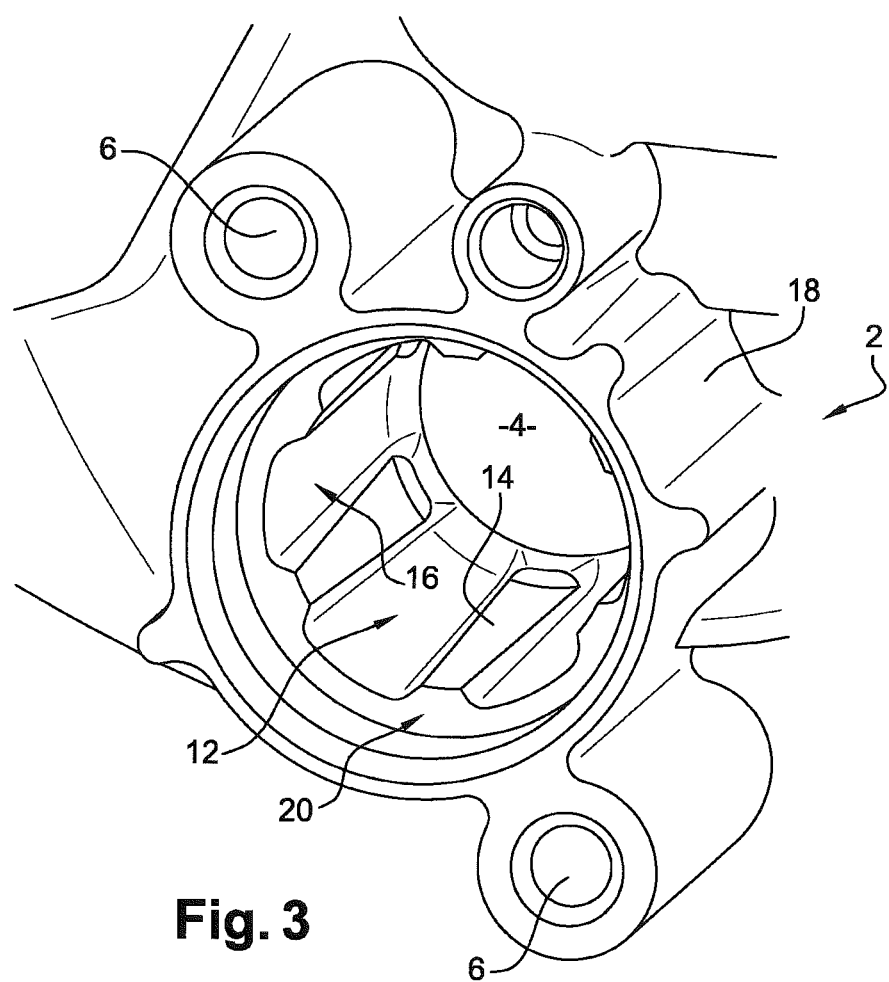

Other features and advantages of the invention will become apparent from reading the following description which relates to some detailed embodiments, with reference to the attached figures which respectively depict:

in FIG. 1, a view in longitudinal section partially illustrating one example of a valve according to the invention;

in FIG. 2, a partial perspective view of a flange of the valve of FIG. 1;

in FIG. 3, a perspective view of the duct of the valve of FIG. 2, illustrated without the flange.

As illustrated in FIG. 1, the invention relates to a valve. Said valve comprises a cast structure or body 2, notably made of aluminum and/or aluminum alloy. In the example that is going to be described, the valve is an exhaust gas recirculation valve, but the invention is not restricted to that example.

In this case, said body 2 comprises gas circulation duct, not visible. A valve shut-off member such as a valve shutter or flap, is configured to close off said gas circulation duct to a greater or lesser extent so as to allow the rate of flow of exhaust gases through the valve to be regulated. Said valve may comprise dynamic members, such as a gear set with cogged wheels, for actuating said shut-off member or members from a valve drive motor. It may further comprise control means, notably a position sensor, for controlling said dynamic and/or shut-off members.

In order to allow it to be cooled, said valve comprises a network of passages for a coolant, notably water to which an antifreeze, particularly glycol, has been added, coming from a vehicle cooling circuit. Said valve comprises at least one duct 4 for the circulation of said coolant via which the coolant enters said valve and/or leaves said valve. Said duct 4 is provided with a wall 10 intended to come into contact with a flange 1 for the circulation of said coolant. Said duct 4 is, for example, of circular cross section.

Said flange 1 here comprises a centering barrel 3 for centering it in said coolant circulation duct 4 in said valve. Said barrel 3 extends in a longitudinal direction D. It defines a circulation channel 5 for said coolant extending in said direction of extension D.

As is more clearly visible in FIG. 2, said barrel 3 is, for example, cylindrical, notably of cylindrical cross section. Said circulation channel 5 may likewise be of circular cross section such that said barrel 3 is formed by an annular wall 17. Said channel 5 opens in said longitudinal direction D, for example at a distal end 11 of the barrel 3. Said barrel 3 encourages the insertion of the flange 1 into said valve and correct positioning thereof with respect thereto.

On this matter, said flange 1 here comprises a mounting plate 7 for fixing to said valve. Said mounting plate 7 is, for example, perpendicular to said barrel 3. It may have orifices 9 for the passage of fixing screws, not illustrated. For its part, said valve comprises for example bores 6 for fixing said flange 1 on said valve using said screws.

Furthermore, said valve may comprise a seal 8 for sealing between said duct 4 for the circulation of coolant and the outside of said valve. Said seal 8 is situated between said flange 1 and said valve and it will be appreciated that sealing is dependent notably on correct positioning of said flange 1 with respect to said valve.

Said flange 1 may comprise, at the base of the barrel 3, a shoulder 15 configured to collaborate with the seal 8. Said flange 1 may of course also comprise one or more connecting orifices, not illustrated, for connection to the cooling circuit feeding said valve.

Said barrel 3 advantageously has one or more passages allowing transverse circulation for the fluid between said valve circulation duct 4 and said circulation channel 5 of said flange 1. What is meant by "transverse" is a direction that is inclined with respect to the longitudinal direction of the barrel 3.

Said coolant is thus directed not only toward the distal end 11 of the barrel 3 but also toward a wall 10 of the circulation duct 4 that is positioned laterally facing said barrel 3. Said wall 10 may therefore also be cooled. This then avoids the formation of hotspots that would experience strong thermal expansion phenomena causing the material of the body 2 to work near the flange 1 and carrying the risk of detracting from the sealing afforded by said seal 8 and correct mechanical connection between the flange 1 and said valve at said bores 6.

Said passage or passages 13 are situated for example between said shoulder 15 and said distal end 11 of the barrel 3. Said passage or passages 13 are here slots extending in the longitudinal direction of extension of the barrel, said slots 13 being open longitudinally to the distal end 11 of the barrel 3. Said slot or slots 13 are three in number here, evenly distributed. Said slots 13 are separated by branches 19 of said barrel 3 extending angularly between two adjacent slots 13 and said barrel. In other words, said slots 13 are formed by interruptions of the annular wall 17 of said barrel 3. Said annular wall 17 is defined here by said branches 19 which are intended to project from the shoulder 15. The distal end 11 of the barrel 3 is, by definition, a distal end of said branches 19.

Said barrel 3 is advantageously provided with rein-forcing ribs 21 arranged in said circulation channel 5 of the barrel 3 between the branches 19. Said rein-forcing ribs 21 are directed, for example, in the direction of longitudinal extension D of said barrel 3, particularly radially. In this instance there are three of them arranged in a star from the longitudinal direction of said channel 5. They split said channel 5 into three sub-channels for the passage of the coolant.

As is more clearly visible in FIG. 3, according to the invention, said wall 10 has a plurality of grooves 16 and of ribs 14 which are configured to limit contact between said flange 1, particularly said barrel 3, and said wall 10 at said ribs 14. In other words, said barrel 3 is in contact only with said ribs 14 but not the grooves 16. Said ribs 14 are formed by machining and said grooves 16 are formed by the molding of the valve. This then limits any loss of skin effects while at the same time maintaining good guidance of the flange.

Said duct 4 advantageously has a direction of longitudinal extension and said ribs 14 and/or said grooves 16 extend in said direction of extension, notably alternating angularly. Here may be seen six ribs 14 and six grooves 16. The annular extent of the grooves 16 may be greater than the annular extent of the ribs 14. The longitudinal extension of the ribs 14 inside said duct 4 is more significant here than that of said barrel 3.

Said ribs 14 and/or said grooves 16 may have a trapezoidal shape, a large base of said ribs 14 then being mounted in the angular continuation of a small base of said grooves 16 whereas a large base of said grooves 16 is mounted in the angular continuation of a small base of said ribs 14. One longitudinal end of said ribs 14 and/or of said grooves 16 and particularly said large bases of the grooves 16 and said small bases of the ribs 14 are mounted facing a mouth of said duct 4.

Said duct 4 advantageously comprises an annular shoulder 20, said shoulder 20 being formed by a longitudinal end of said ribs 14 and/or of said grooves 16. Another shoulder 30 may also be provided at the other longitudinal end of said ribs 14.

As is more clearly visible in FIG. 2, said duct 4 is, for example, flared at the position of said barrel 3 so as to create a jacket 12 for the circulation of said coolant between said barrel 3 and the wall 10 of said duct 4, in the region of said grooves 16.

It may also be seen in FIG. 3 that said valve may comprise a projecting part 18 projecting from the rest of its body 2 in the region of which projecting part the mouth of said circulation duct 4 and/or said bores 6 are formed.

The invention claimed is:

1. An exhaust gas recirculation valve, said valve comprising:
   a flange; and
   a duct for the circulation of a coolant, said duct being provided with a wall intended to come into contact with the flange comprising a centering barrel for circulation of said coolant, said wall having a plurality of grooves and of ribs which are configured to limit contact between said flange and said wall in the region of said ribs, said ribs being formed by machining and said grooves originating from a molding of the valve,
   wherein the centering barrel of the flange defines a circulation channel, the centering barrel having at least one passage that allows transverse circulation for the coolant between the duct and the circulation channel of the flange.

2. The valve as claimed in claim 1, said duct having a longitudinal direction of extension and said ribs and/or said grooves extending in said direction of extension.

3. The valve as claimed in claim 2, said ribs and said grooves alternating angularly in a plane perpendicular to said direction of extension.

4. The valve as claimed in claim 2, said ribs and/or said grooves having a trapezoidal shape in a plane perpendicular to said direction of extension.

5. The valve as claimed in claim 2, one longitudinal end of said ribs and/or of said grooves being mounted facing a mouth of said duct.

6. The valve as claimed in claim 2, said duct comprising a shoulder, said shoulder being formed by a longitudinal end of said ribs and/or of said grooves.

7. The valve as claimed in claim 1, comprising a part projecting from a body of said valve in the region of which said duct opens.

8. The valve as claimed in claim 1, said ribs being intended to come into contact with the centering barrel of said flange.

* * * * *